United States Patent
Huang et al.

(10) Patent No.: US 10,147,569 B1
(45) Date of Patent: Dec. 4, 2018

(54) KEYBOARD BACKLIGHT MODULE

(71) Applicant: Dell Products, L.P., Round Rock, TX (US)

(72) Inventors: Wen-Pin Huang, Taipei (TW); Erh-Chieh Chang, Taipei (TW); Chih-Hao Chen, Taipei (TW)

(73) Assignee: Dell Products, L.P., Round Rock, TX (US)

( * ) Notice: Subject to any disclaimer, the term of this patent is extended or adjusted under 35 U.S.C. 154(b) by 3 days.

(21) Appl. No.: 15/701,169

(22) Filed: Sep. 11, 2017

(51) Int. Cl.
- *G06F 3/00* (2006.01)
- *H01H 13/83* (2006.01)
- *G06F 3/02* (2006.01)
- *F21V 8/00* (2006.01)

(52) U.S. Cl.
CPC ........... *H01H 13/83* (2013.01); *G02B 6/0031* (2013.01); *G06F 3/02* (2013.01)

(58) Field of Classification Search
CPC ..... G02B 6/0031; G02B 6/0021; H01H 13/83
USPC ...................................... 362/23.03
See application file for complete search history.

(56) References Cited

U.S. PATENT DOCUMENTS

| | | | | |
|---|---|---|---|---|
| 2013/0070476 A1* | 3/2013 | Kunimochi | ......... | G02B 6/0083 362/606 |
| 2013/0250617 A1* | 9/2013 | Ahn | ..................... | G02B 6/0021 362/613 |
| 2014/0009903 A1* | 1/2014 | Peng | ..................... | G02B 6/0021 362/23.03 |
| 2014/0168934 A1* | 6/2014 | Chen | ..................... | H01H 13/83 362/23.03 |
| 2014/0334125 A1* | 11/2014 | Yao | ..................... | G02B 6/0055 362/23.03 |
| 2015/0109757 A1* | 4/2015 | Chen | ..................... | H01H 13/83 362/23.03 |
| 2017/0363800 A1* | 12/2017 | Liu | ..................... | G02B 6/0081 |

* cited by examiner

*Primary Examiner* — Evan Dzierzynski
*Assistant Examiner* — Gerald J Sufleta, II
(74) *Attorney, Agent, or Firm* — Fogarty LLP

(57) ABSTRACT

Systems and methods for a keyboard backlight module are described. In some embodiments, a keyboard backlight module may include: a Light Guide Plate (LGP), a reflector coupled to the LGP, and a light bar at least partially sandwiched between the LGP and the reflector.

8 Claims, 4 Drawing Sheets

KEYBOARD BACKLIGHT MODULE

FIELD

The present disclosure generally relates to electronic keyboards, and, more particularly, to keyboard backlight modules.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more input devices through which a user can interact with the system. Examples of conventional input devices include keyboards. A keyboard is an apparatus that uses an arrangement of buttons or keys configured to act as mechanical levers or electronic switches.

Generally, a keyboard has symbols such as numerals and characters engraved or printed on its keys. Each press of a key by the user causes its corresponding symbol to be received by (or input into) the information handling system.

In many cases, keyboards may be illuminated from inside to facilitate use in dark environments. For example, some keyboards have lighted keys. More recently, backlight modules have been developed that cause the keys to appear to themselves emit some light.

SUMMARY

Embodiments of systems and methods for keyboard backlight modules are described. In an illustrative, non-limiting embodiment, a keyboard backlight module may include a Light Guide Plate (LGP), a reflector coupled to the LGP, and a light bar at least partially sandwiched between the LGP and the reflector. The LGP may include a substrate forming one or more paths through which visible light travels.

The LGP may include holes disposed in a pattern selected to receive a light emitting diodes (LEDs) on the light bar. The light bar may include a flexible printed circuit (FPC), and wherein the LEDs are coupled to the FPC. A longitudinal edge of the FPC may be disposed between the reflector and the LGP. The longitudinal edge of the FPC may extend beyond a longitudinal edge of the reflector such that the FPC overlaps with the reflector. A thickness of a portion of the FPC nearest the longitudinal edge of the FPC may be smaller than a thickness of another portion of the FPC under an LED. The reflector may include a layer of white and non-transparent material.

In another illustrative, non-limiting embodiment, a backlit keyboard may include a plurality of keys and a backlight module optically coupled to the plurality of keys, wherein the backlight module further comprises: an LGP, a reflector coupled to the LGP, and a light bar at least partially sandwiched between the LGP and the reflector.

The LGP may include a substrate having one or more light paths. The light bar may include LEDs mounted on an FPC. A longitudinal edge of the FPC may be disposed between the reflector and the LGP. The longitudinal edge of the FPC may extend beyond a longitudinal edge of the reflector such that the FPC overlaps with the reflector. A thickness of a portion of the FPC nearest the longitudinal edge of the FPC is smaller than a thickness of another portion of the FPC under an LED.

In yet another illustrative, non-limiting embodiment, a method for assembling a keyboard backlight module may include: coupling an LGP to a masking layer, coupling a light bar to the LGP, and coupling a reflector layer to the LGP. The LGP may include a substrate having one or more light paths. The light bar may include LEDs mounted on an FPC. A longitudinal edge of the FPC may be disposed between the reflector and the LGP. The longitudinal edge of the FPC may extend beyond a longitudinal edge of the reflector such that the FPC overlaps with the reflector. A thickness of a portion of the FPC nearest the longitudinal edge of the FPC may be smaller than a thickness of another portion of the FPC under an LED.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
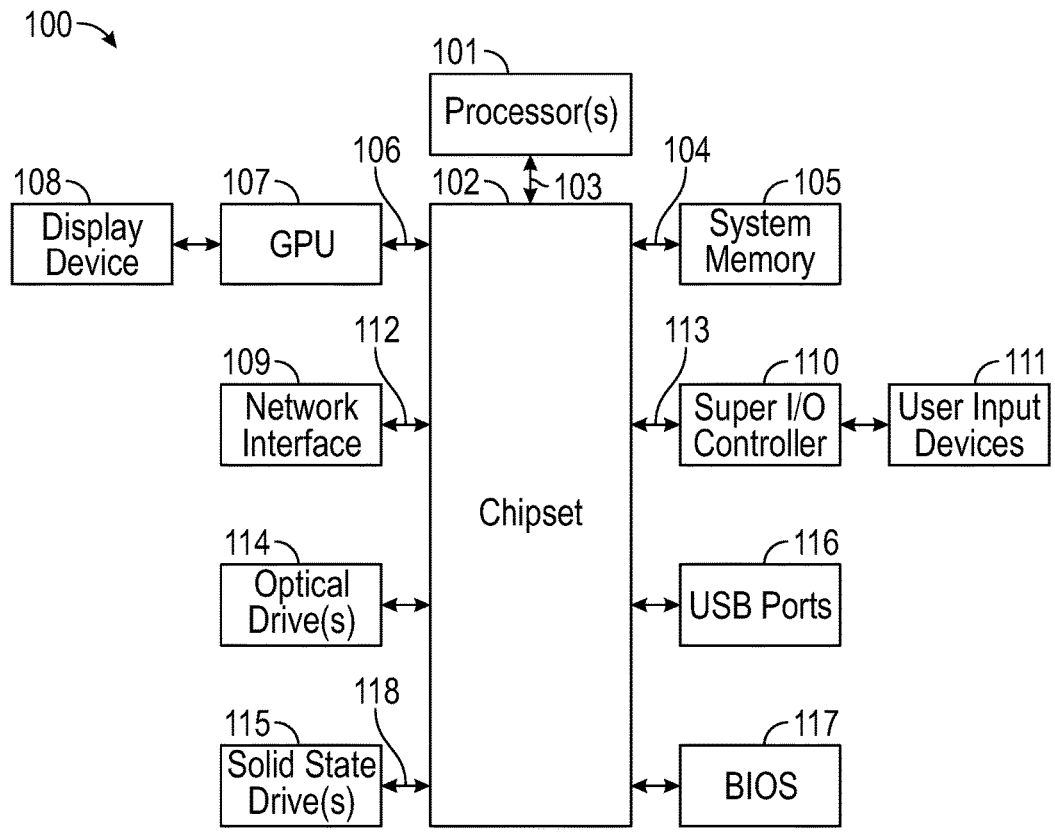
FIG. 1 is a block diagram of examples of components of an Information Handling System (IHS) having a keyboard with a backlight module according to some embodiments.

Embodiments described herein comprise keyboard backlight modules. A backlight module includes a plurality of layers or sheets that are configured, assembled, or otherwise disposed in a stack. Examples of such layers include masking layers, light guide plates (LGPs), and reflector layers. The backlight module's light source is referred to as a "light bar," and includes one or more emitting diode (LED) flexible printed circuits (FPCs).

In a conventional backlight module, all portions of the light bar that come into contact with the reflector layer are disposed under that layer. However, as the inventors hereof have recognized, in this conventional configuration, light emitted by the light bar's LEDs is partially blocked by the reflector layer above it, causing an average of 10% reduction in brightness.

Accentuating this problem, there is currently a trend to decrease the overall z-height (or thickness) of Information Handling Systems (IHSs), which makes keyboard backlight performance and optimization an important issue, particularly in battery-powered systems. Yet, it is common industry practice to trade brightness for any Z-height reduction—which is sometimes achieved by reducing the thickness of the LGP. As LGPs' profiles are reduced to meet modern IHSs' slim form factor requirements, it becomes a difficult challenge to provide desirable backlight brightness levels.

To address these, and other problems, a backlight module described herein may have a stack in the following order: (1) masking layer, (2) LGP, (3) LED FPC, and (4) reflector layer. Placement of the LED FPC above the reflector into a middle layer of the backlight module allows light to be 100% directed into the LGP with no loss, without being blocked by the reflector layer; which in turn offers a 19% increase or greater in average measured brightness.

The resulting increase in brightness offers more flexibility in tuning performance and offers the potential to save cost by reducing the number of LEDs. At the same time, embodiments described herein offer no observable impact in complexity.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

FIG. 1 illustrates example components of IHS 100. As shown, IHS 100 includes one or more processors 101. In various embodiments, IHS 100 may be a single-processor system including one processor 101, or a multi-processor system including two or more processors 101. Processor(s) 101 may include any processor capable of executing program instructions, such as any general-purpose or embedded processor implementing any of a variety of Instruction Set Architectures (ISAs).

IHS 100 comprises chipset 102 that may include one or more integrated circuits that are connected to processor(s) 101. In certain embodiments, chipset 102 may utilize QPI (QuickPath Interconnect) bus 103 for communicating with the processor(s) 101. Chipset 102 provides processor(s) 101 with access to a variety of resources. For instance, chipset 102 provides access to system memory 105 over memory bus 104. System memory 105 may be configured to store program instructions and/or data accessible by processors(s) 101. In various embodiments, system memory 105 may be implemented using any suitable memory technology, such as static RAM (SRAM), dynamic RAM (DRAM) or nonvolatile/Flash-type memory.

Chipset 102 may also provide access to Graphics Processing Unit (GPU) 107. In certain embodiments, graphics processor 107 may part of one or more video or graphics cards that have been installed as components of IHS 100. Graphics processor 107 may be coupled to the chipset 102 via graphics bus 106 such as provided by an AGP (Accelerated Graphics Port) bus or a PCIe (Peripheral Component Interconnect Express) bus. In certain embodiments, GPU 107 generates display signals and provides them to display device 108.

In certain embodiments, chipset 102 may also provide access to one or more user input devices 111. In such embodiments, chipset 102 may be coupled to a super I/O controller 110 that provides interfaces for a variety of user input devices 111, in particular lower bandwidth and low data rate devices.

For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. These I/O devices may interface with super I/O controller 110 through wired or wireless connections. In certain embodiments, chipset 102 may be coupled to super I/O controller 110 via Low Pin Count (LPC) bus 113.

Other resources may also be coupled to processor(s) 101 of IHS 100 through chipset 102. In certain embodiments, chipset 102 may be coupled to a network interface 109, such as provided by a Network Interface Controller (NIC) that is coupled to IHS 100. In certain embodiments, network interface 109 may be coupled to chipset 102 via PCIe bus 112. According to various embodiments, network interface 109 may also support communication over various wired and/or wireless networks and protocols (e.g., Wi-Fi, Bluetooth, etc.). In certain embodiments, chipset 102 may also provide access to one or more Universal Serial Bus (USB) ports 116.

Chipset 102 also provides access to one or more solid state storage devices 115 using PCIe bus interface connection 118. In certain embodiments, chipset 102 may also provide access to other types of storage devices. For instance, in addition to solid state storage device 115, IHS 100 may also utilize one or more magnetic disk storage devices, or other types of the storage devices such as optical drive(s) 114 or a removable-media drive. In various embodiments, solid state storage device 115 may be integral to IHS 100, or may be located remotely from IHS 100.

Upon powering or restarting IHS 100, processor(s) 101 may utilize instructions stored in Basic Input/Output System (BIOS) or Unified Extensible Firmware Interface (UEFI) chip 117 to initialize and test hardware components coupled to IHS 100 and to load an Operating System (OS) for use by IHS 100. Generally, BIOS 117 provides an abstraction layer that allows the OS to interface with certain hardware components that utilized by IHS 100. It is through this hardware abstraction layer that software executed by the processor(s) 101 of IHS 100 is able to interface with I/O devices that coupled to IHS 100.

In various embodiments, IHS 100 may not include each of the components shown in FIG. 10. Additionally or alternatively, IHS 100 may include various components in addition to those that are shown. Furthermore, some components that are represented as separately may, in other embodiments, be integrated with other components. For example, in various implementations, all or a portion of the functionality provided by the illustrated components may instead be provided by components integrated into the one or more processor(s) 101 as a system-on-a-chip (SOC) or the like.

Figure 2:
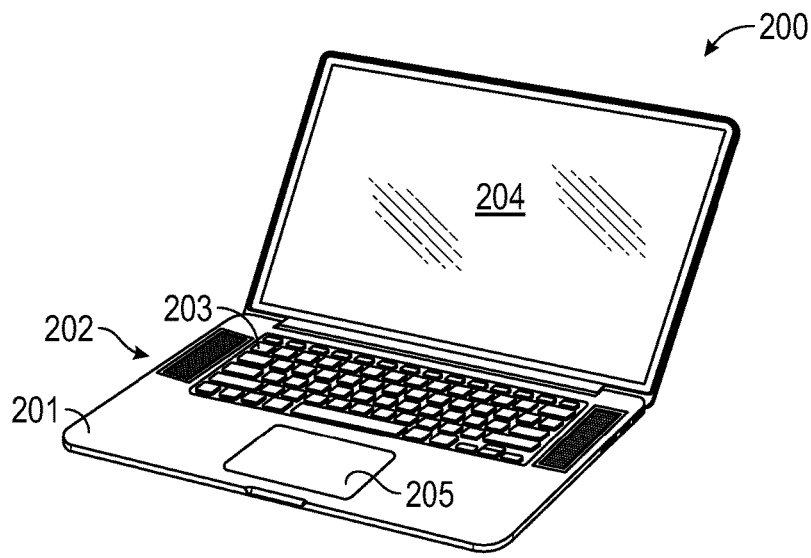
FIG. 2 is a perspective view of an example of an Information Handling System (IHS) having a keyboard with a backlight module according to some embodiments.

FIG. 2 is a perspective view of an example of Information Handling System (IHS) 100 having keyboard with backlight module assembly 202 (referred to simply as 'keyboard" 202, examined below). In various embodiments, IHS 200 may include any number of internal and/or external components 100, described in FIG. 1.

As shown, IHS 200 includes base or bottom portion 201 fastened to lid or top portion 204. In many implementations, top portion 204 may be pivot-ably coupled to base portion 201, such that top portion 204 may be moved between a closed position and an open position with respect to base portion 201.

In some cases, top portion 204 may include a display or the like to present visual content such as a graphical user interface, still images, video, etc. using any appropriate technology such as a liquid crystal display (LCD), organic light-emitting diode (OLED), etc. Conversely, base portion 201 may accommodate user input devices such as keyboard 202 and touchpad 205. Touch pad 205 may be configured to receive finger gesturing or the like.

Keyboard 202 may include a plurality of low-profile keycap assemblies, each having an associated key 203. Each key 203 may have a symbol imprinted thereon for identifying the key input associated with the particular key. In operation, keyboard 202 may be arranged to receive a discrete input at each keypad using a finger motion usually referred to as keystrokes. Keystrokes may be converted to electrical signals that are passed to a processing unit of IHS 200 (e.g. processor(s) 101) for evaluation and/or control.

Figure 3:
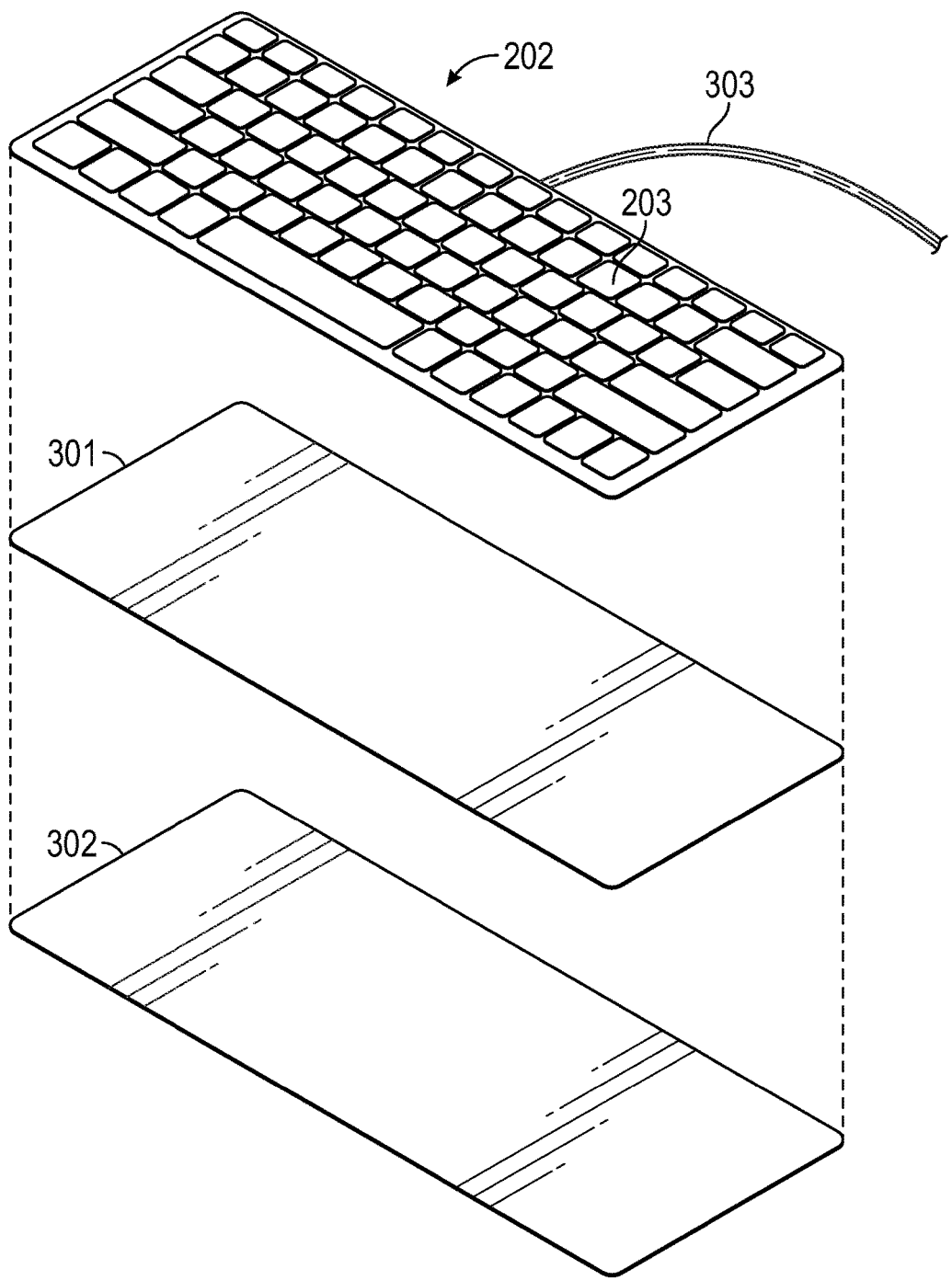
FIG. 3 is an exploded view of an example of a keyboard with a backlight module according to some embodiments.

FIG. 3 is an exploded view of an example of keyboard 202 according to some embodiments. Keyboard cable 303 includes wiring that interfaces electronic components within keyboard 202 with processing elements in IHS 200. For example, inputs made at key 203 may be communicated through keyboard cable 303 for use by processor(s) 101. In other cases, however, keyboard 202 may be coupled to IHS 200 wirelessly, for instance, over a Bluetooth communication channel between keyboard 202 and IHS 200.

In addition to keys 203 (extending out of an upper surface to provide selectable inputs based upon the characters associated with the keys, such as a QWERTY keyboard that provides ASCI binary code), keyboard 202 may also include electromechanical layer 301 having membranes, lever structures, metal plates, domes, and/or electronic circuits necessary for the operation of keyboard 202 as an input device. In alternative embodiments, keyboard 202 may include capacitive touch or other features that detect key presses with or without physical movement of keys 203.

As a person of ordinary skill in the art will recognize in light of this disclosure, electromechanical layer 301 may have a variety of structures for placement of keys 203 as individual caps or assembled as one part, to bias keys 203 upwards, to detect keystrokes, etc.

Figure 4:
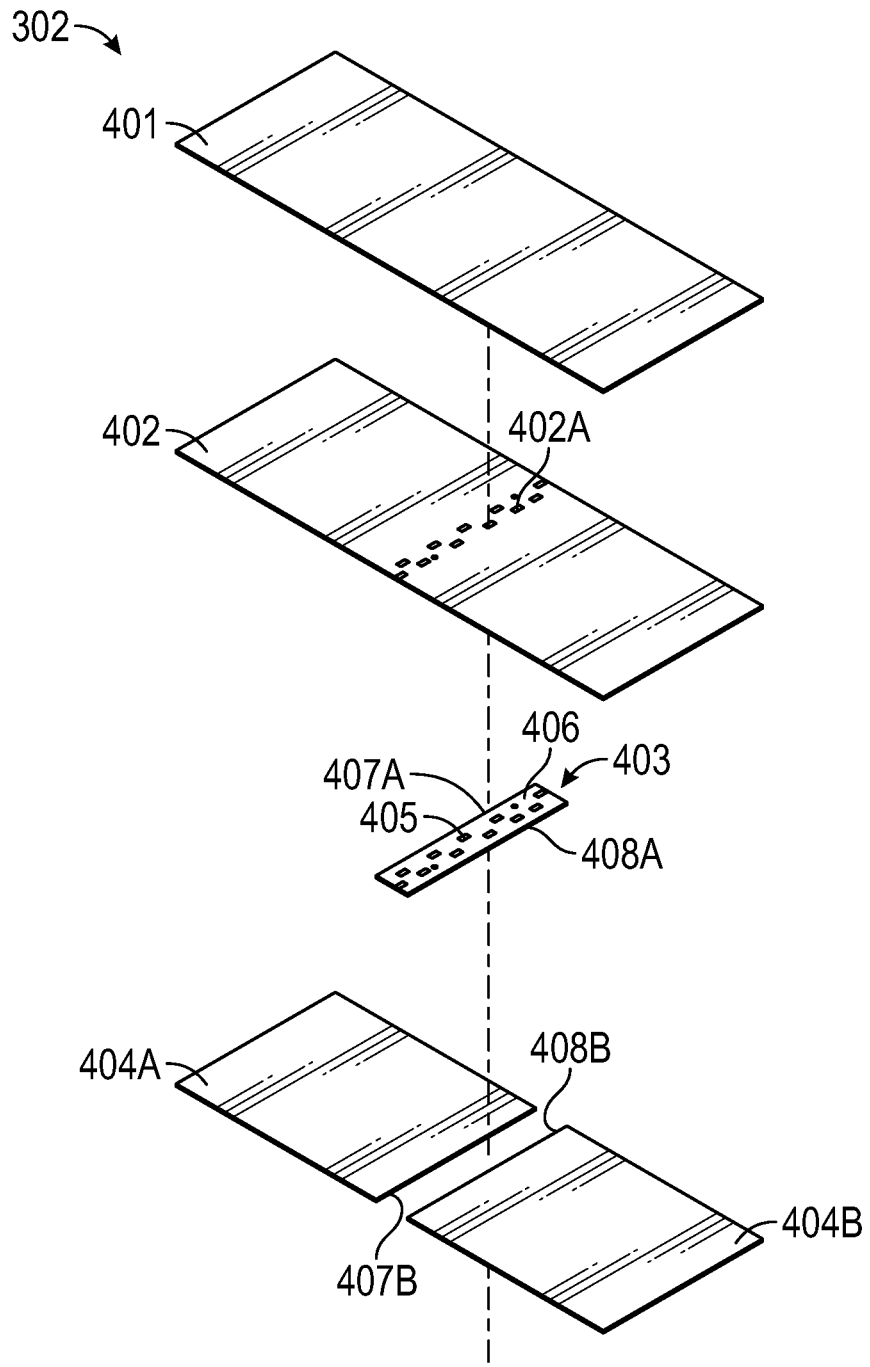
FIG. 4 is an exploded view of an example of a backlight module according to some embodiments.

Finally, backlight module 302 is assembled underneath electromechanical layer 301. FIG. 4 is an exploded view of an example of backlight module 302 according to some embodiments. Particularly, backlight module 302 itself also includes a number of internal layers stacked in the following order: (1) masking layer 401, (2) LGP 402, (3) light bar or LED FPC 403, and (4) reflector layer 404.

LGP 402 includes a substrate forming one or more paths or "light guides" or optical channels through which visible light travels. Moreover, LGP 402 may include slots 402A at locations corresponding to the positions of LEDs 405 on the top surface of light bar 403, such that each LED 405 is inserted into a corresponding slot 402A during the assembly of backlight module 302. LEDs 405 of light bar 403 are mounted or disposed on flexible conductor or substrate 406.

As illustrated, flexible conductor or substrate 406 has two longitudinal edges: left edge 407A and right edge 408A. Reflective layer 404 may be a substrate or surface of white and non-transparent material, so that light exiting LGP 402 is reflected upwards. In this case, reflective layer is at least partially broken into two portions 404A-B with a gap in between (collectively referred to as "reflector 404").

Left reflector portion 404A includes left longitudinal reflector edge 407B (corresponding to left light bar edge 407A of light bar 403), and right reflector portion 404B includes right longitudinal reflector edge 408B (corresponding to right light bar edge 408A of light bar 403). In some cases, left and right reflector portions 404A-B may be separate from each other. In other cases, left and right reflector portions 404A-B may a gap or opening in single sheet of reflective material—that is, a single-piece reflector 404 with backward compatibility with current generation materials.

Reflector 404 is located under LGP 402, with light bar 403 sitting in the gap formed between left and right reflector portions 404A and 404B, such that those two portions reflect light emitted through LGP 402 toward masking layer 401. Light passes through LGP 402 at predetermined position(s) on masking layer 401, and emerges out of transparent area(s) of key 203, so that users can see light projecting outward from symbols printed on keyboard 202.

Figure 5:
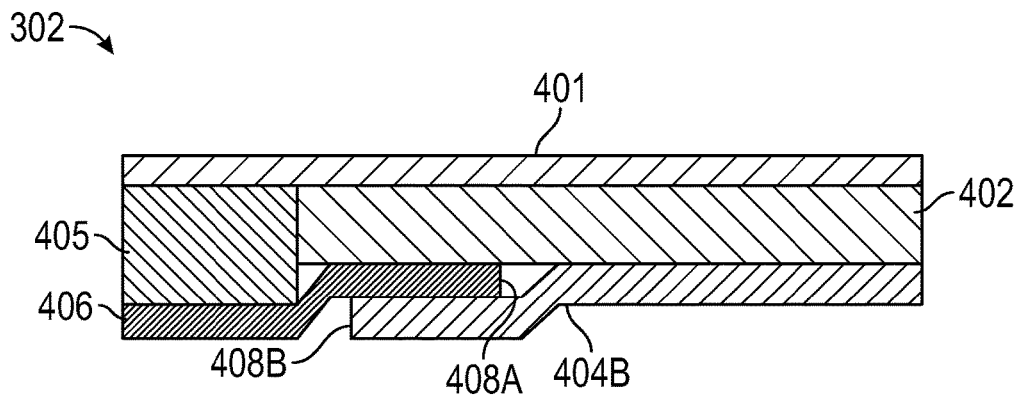
FIG. 5 is a sectional diagram of an example of a backlight module according to some embodiments.

Still referring to FIG. 4, placement of light bar 403 edges entirely above reflector layer 404 and into a "middle layer" of backlight module 202 allows light to be directed into LGP 402 without loss due to blocking by the edge of reflector layer 404. To further illustrate this, FIG. 5 is a diagram of backlight module 302 designed according to embodiments described herein—shown in contrast with conventional backlight module 600 of FIG. 6.

Again, backlight module 302 includes masking layer 501 located above LGP 402. LED 405 is supported by FPC 406, and includes right light bar edge 408A. Right reflector portion 404B sits under LGP 402, and includes right longitudinal reflector edge 408B.

In this example, LED 605 sits immediately below masking layer 501. As a person or ordinary still in the art will immediately recognize in light of this disclosure, a number of additional layers, not shown herein, may be present between the various layers and elements of backlight module 302. For instance, one or more adhesive layers, controllers, electrical connector(s) or traces (not shown) may also be used.

FPC 406 part of light bar 403 is at least partially sandwiched between LGP 402 and reflector 404A-B. Right light bar edge 408A overlaps and/or extends beyond right longitudinal reflector edge 408B of second reflector portion 404B, while sitting above right reflector portion 404B.

In some cases, FPC 406 and reflector 404A-B may have approximately the same thickness throughout their entire surfaces. In these cases, the overlapping portion results in localized "bump" on FPC 406, which is inconsequential in many applications. Alternatively, only portions of FPC 406 and reflector 404A-B that do not overlap with each other may have approximately the same thickness (e.g., within a 2%, 5%, 10%, or 25% margin).

Alternatively, portions of FPC 406 and/or portions of reflector 404A-B that overlap with each other may have their thickness(es) dimensioned and/or reduced compared to other, non-overlapping portions of FPC 406 (e.g., under LEDs 405) and/or reflector 404A-B, to maintain an overall thickness profile of backlight module 302 across the entire module. For instance, the overlapping portion of FPC 406 may have a thickness that is half the thickness under LED 405, and the overlapping portion of reflector 404A-B may have a thickness that is half the thickness immediately underneath LGP 402. Generally, the more structurally stable layer (e.g., FPC 406) may have its peripheral thickness reduced more than the less structurally stable layer (e.g., reflective layer).

Figure 6:
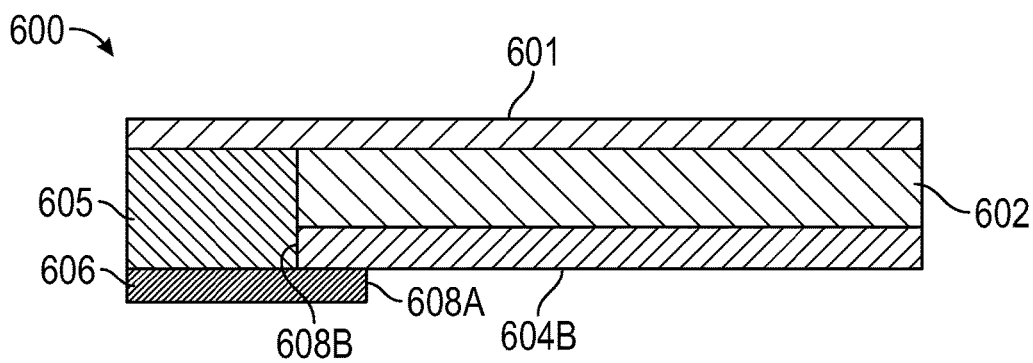
FIG. 6 is a sectional diagram of an example of a conventional backlight module, labeled "Prior Art."

In contrast with the foregoing, conventional backlight module 600 is shown in FIG. 6. Particularly, backlight module 600 includes masking layer 601 located above LGP 602. LED 605 is supported by FPC 606 and it includes edge 608A. Reflector portion 604B sits under LGP 602 and includes reflector edge 608B. In sharp contrast with backlight module 302, conventional module 600 has FPC 606 entirely underneath reflector portion 604B. Emitted light is partially blocked by reflector edge 608B, causing an average of 10% reduction in brightness.

Figure 7:
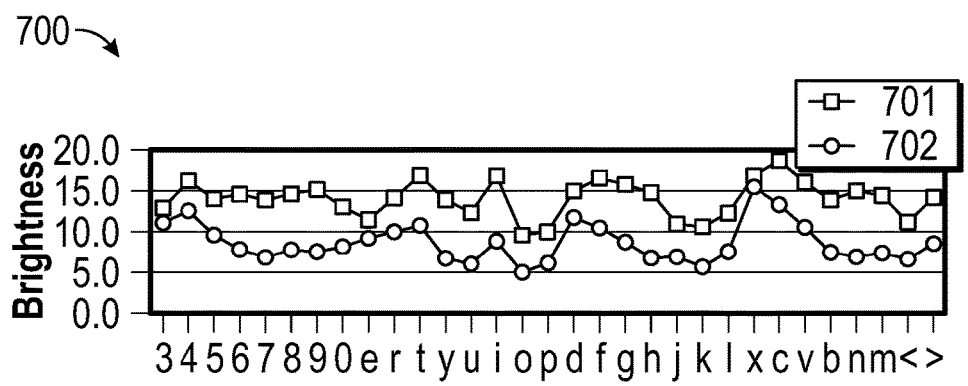
FIG. 7 is a graph illustrating results obtained with a backlight module according to some embodiments.

Graph 700 of FIG. 7 illustrates results obtained with backlight module 302 according to some embodiments. Particularly, curve 701 represents the brightness obtained with backlight module 302, and curve 702 represents the brightness obtained with conventional backlight module 600. The horizontal axis identifies each of keys 203 (numbers, letters, etc.) of keyboard 202, and the vertical axis shows the brightness (in nits) for the corresponding key 203 when backlight module 302 is turned on.

It should be noted that the brightness obtained with backlight module 302 is markedly superior to that of conventional module 600. Particularly, the average brightness of the measured keys increases by as much as 19% (or more) when backlight module 302 is used.

Referring again to FIGS. 5 and 6, the improvement in brightness afforded by backlight module 302 may be attributed, at least in part, to the relative positions of overlapping portions 408A-B (and also to the symmetric arrangement of edges 407A-B on the opposite longitudinal side of FPC 406). The increased performance allows a reduction in the thickness of LGP 402, thus reducing the Z-height with the same overall keyboard brightness. For example, in some cases, the proposed stack-up may result in an overall 0.05 mm Z-height decrease (e.g., due to a reduction in thickness of LGP 402) with no significant degradation in performance.

In various embodiments, systems and methods described herein may increase overall brightness in a keyboard, provide better backlight performance with other color LEDs using the same number of LEDs, and/or decrease Z-height (Z-height of LGP can be reduced with increased backlight capabilities). These systems and methods may also decrease resource usage, decrease keyboard backlight optimization during development phase, and/or save manufacturing costs (e.g., it can decrease the number of LEDs needed: if the original design requires 10 LEDs, new designs may be implemented using only 8 LEDs). Implementations described herein may also be modular, which results in no complexity increase or impact on the system side.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A keyboard backlight module, comprising:
   a Light Guide Plate (LGP);
   a reflector coupled to the LGP; and
   a light bar at least partially sandwiched between the LGP and the reflector, wherein the light bar includes light emitting diodes (LEDs) mounted on a flexible printed circuit (FPC), wherein a longitudinal edge of the FPC is disposed between the reflector and the LGP, wherein a thickness of a portion of the FPC nearest the longitudinal edge of the FPC is smaller than a thickness of another portion of the FPC under an LED, wherein a thickness of a portion of the reflector nearest a longitudinal edge of the reflector is smaller than a thickness of another portion of the reflector under the LGP, and wherein the longitudinal edge of the FPC extends beyond the longitudinal edge of the reflector such that the FPC overlaps with the reflector and blocks light emitted by the LEDs from entering the longitudinal edge of the reflector.

2. The keyboard backlight module of claim 1, wherein the LGP includes a substrate forming one or more paths through which visible light travels.

3. The keyboard backlight module of claim 1, wherein the LGP includes holes disposed in a pattern selected to receive a respective light emitting diode on the light bar.

4. The keyboard backlight module of claim 1, wherein the reflector includes a layer of white and non-transparent material.

5. A backlit keyboard, comprising:
   a plurality of keys; and
   a backlight module optically coupled to the plurality of keys, wherein the backlight module further comprises:
      a Light Guide Plate (LGP), wherein the LGP includes a substrate having one or more light paths;
      a reflector coupled to the LGP; and
      a light bar at least partially sandwiched between the LGP and the reflector, wherein the light bar includes light emitting diodes (LEDs) mounted on a flexible printed circuit (FPC), wherein a longitudinal edge of the FPC is disposed between the reflector and the LGP, wherein the longitudinal edge of the FPC extends beyond a longitudinal edge of the reflector such that a portion of the FPC bends over the reflector, wherein a thickness of a portion of the reflector nearest the longitudinal edge of the FPC is smaller than a thickness of another portion of the reflector under the LGP, and wherein the portion of the FPC that bends over the reflector blocks light emitted by the LEDs from entering the longitudinal edge of the reflector.

6. A method for assembling a keyboard backlight module, the method comprising:
   coupling a Light Guide Plate (LGP) to a masking layer;
   coupling a light bar to the LGP, wherein the light bar includes light emitting diodes (LEDs) mounted on a flexible printed circuit (FPC); and
   coupling a reflector layer to the LGP, wherein a longitudinal edge of the FPC is disposed between the reflector and the LGP, wherein a thickness of a portion of the FPC nearest the longitudinal edge of the FPC is smaller than a thickness of another portion of the FPC under an LED, and wherein a thickness of a portion of the reflector layer nearest the longitudinal edge of the FPC is smaller than a thickness of another portion of the reflector layer under the LGP.

7. The method of claim 6, wherein the other portion of the reflector layer is positioned vertically higher than the other portion of the FPC in the keyboard backlight module.

8. The method of claim 6, wherein the longitudinal edge of the FPC extends beyond a longitudinal edge of the reflector such that the FPC overlaps with the reflector.

* * * * *